Feb. 1, 1955
R. FUENTES M. ET AL
2,700,982
BRAKE PRESERVER
Filed March 19, 1951
2 Sheets—Sheet 1
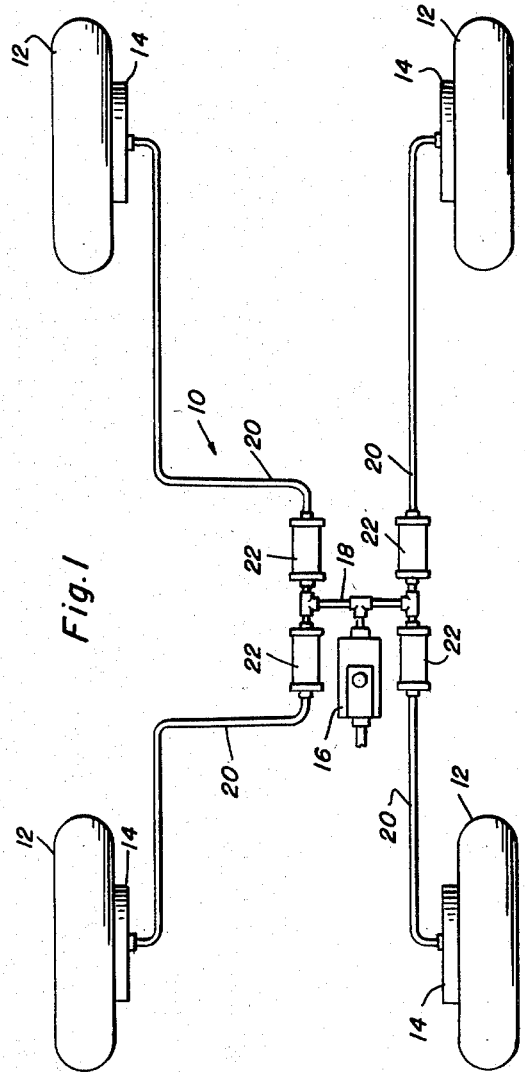
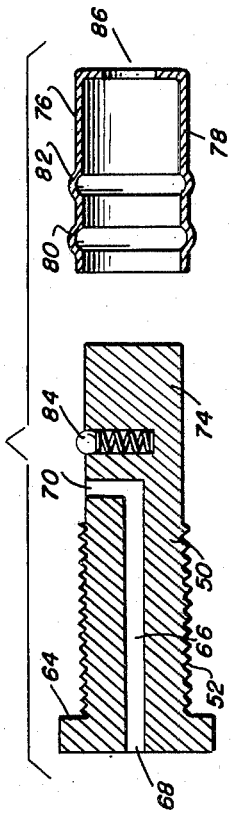
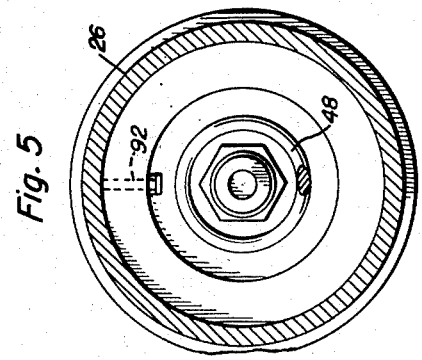
RAFAEL FUENTES M.
ARTURO MESA R.
*INVENTORS.*

Feb. 1, 1955    R. FUENTES M. ET AL    2,700,982
BRAKE PRESERVER

Filed March 19, 1951    2 Sheets-Sheet 2

RAFAEL FUENTES M.
ARTURO MEZA R.
*INVENTORS.*

United States Patent Office 2,700,982
Patented Feb. 1, 1955

2,700,982

BRAKE PRESERVER

Rafael Fuentes M. and Arturo Meza Romero, Tijuana, Baja California, Mexico

Application March 19, 1951, Serial No. 216,344

1 Claim. (Cl. 137—460)

This invention relates broadly to hydraulic brake systems and more particularly to a safety device which operates, in case of breakage of a conduit in the braking system, or the development of a serious leak in a portion thereof, to isolate the impaired section of the system from the remainder of the hydraulic system. In this way the greater part of the braking system is preserved, thus avoiding accidents and possible loss of life due to breakage or rupture of a conduit in the hydraulic braking system.

The present invention has particular utility in connection with the hydraulic braking systems of motor vehicles, but the invention may be advantageously used in preserving the loss of hydraulic fluid and providing for safe operation of a vehicle or transport means wherein hydraulic fluid is employed for controlling its operation or stoppage thereof.

In conventional hydraulic braking systems for motor vehicles, a master cylinder is provided having conduit connections therefrom to the brakes on each wheel. Actuation of the brakes at the wheel is effected by the application of pressure to the master cylinder which when the cylinder and system are filled with hydraulic fluid, is communicated substantially uniformly through the connecting conduits to the individual brake-actuating means located at each of the wheels. Impairment of one of the conduits in the hydraulic system will permit loss of hydraulic fluid from the entire braking system so that all of the brakes are rendered inoperative. Thus, the factor of safety in utilizing such a system is very low. It is accordingly, a principal object of this invention to overcome the low factor of safety in such hydraulic braking systems by the application of a brake preserver device in one or more sections of the system.

Another object of the invention is the provision of means comprising a piston and cylinder operable by the hydraulic fluid pressure in the braking system for bringing about the isolation of that portion of a system wherein a break or serious leakage develops.

Another object is to provide a simple device which can be easily installed in conventional hydraulic braking systems and which will operate quickly and effectively upon the rupture of a conduit in a system to prevent serious loss of braking fluid so that the remaining part of the hydraulic system is preserved and is operable to bring about the desired braking action.

While it has been proposed, heretofore, to utilize auxiliary piston operated valve means to localize broken sections, such devices have not been sufficiently quick-acting and such as will prevent serious loss of hydraulic fluid with resultant impairment of the braking system when a break occurs during operation of the braking system. The present invention provides such an improved safety device which is simple in construction and operation and is quickly actuated to restrict the loss of hydraulic fluid to a minimum in case of breakage of a conduit.

Further objects and advantages will become apparent as the description proceeds, and for a full understanding of the invention reference is to be had to the drawings forming a part of this application, in which:

Figure 1 is a plan view of a chassis portion of a motor vehicle which is provided with a four-wheel hydraulic braking system, and wherein the brake preserver device of this invention is installed in the branch line connecting the master cylinder to the brake actuating mechanism located at each of the wheels.

Figure 4 is an exploded sectional view of the cylinder portion comprising a by-pass channel and associated co-axial slidable valve member for closing the by-pass opening; and Figure 5 is a sectional view taken on the line 5—5 of Figure 2 and looking in the direction of the arrows.

Figure 2:
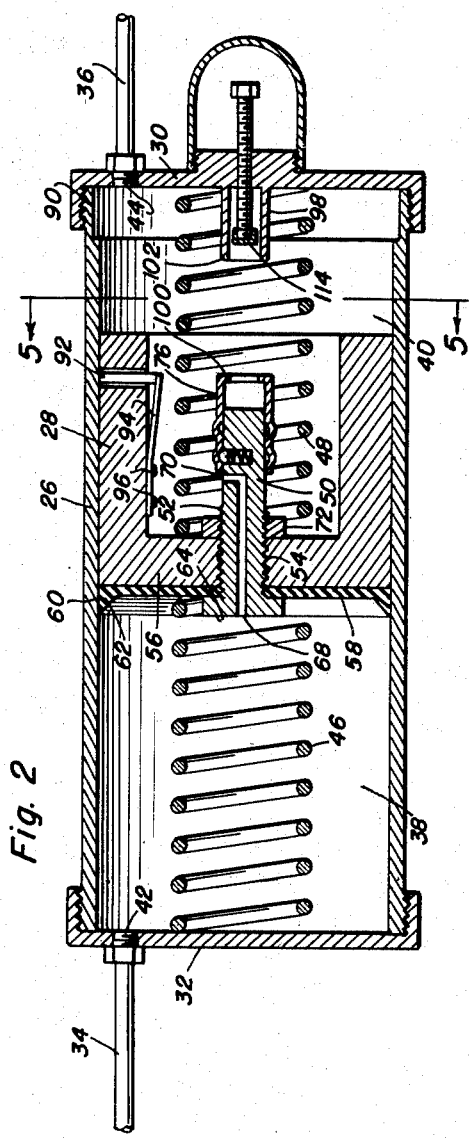
Figure 2 is a longitudinal section through the brake preserver device of this invention, and illustrating the piston in operating position for normal actuation of the braking system.

Referring now more particularly to the drawings, a hydraulic brake system, generally designated 10, and illustrated in Figure 1 is shown connected with the four wheels 12 of a motor vehicle, each of the wheels being provided with braking means such as generally indicated at 14. The hydraulic braking system comprises a foot-operated master cylinder 16, of conventional construction, which is actuated, when the system is filled with hydraulic fluid, to transmit fluid pressure through the main line 18 to the branch pipe lines 20, leading to the four respective braking means 14 of a motor vehicle.

As shown in Figure 1, each brake line branch 20 is provided with a brake preserver device 22 of this invention, which is constructed and operated as hereinafter described. The brake preserver device serves to cut-off the flow of hydraulic fluid from the main line 18 as supplied thereto from the master cylinder should a break or serious leak occur in one or more of the branch lines. The brake preservers are preferably mounted closely to the master cylinder so that the greatest protection may be provided to the braking system. In this manner, should a break or rupture of the line occur in any of the branch lines, drainage of the pressure fluid is localized only in the broken branch lines, thus preserving the hydraulic fluid of the other lines, whereby actuation of the remaining brakes by the application of fluid pressure thereto through the unimpaired branch lines of the other wheels is permitted.

Figure 3:
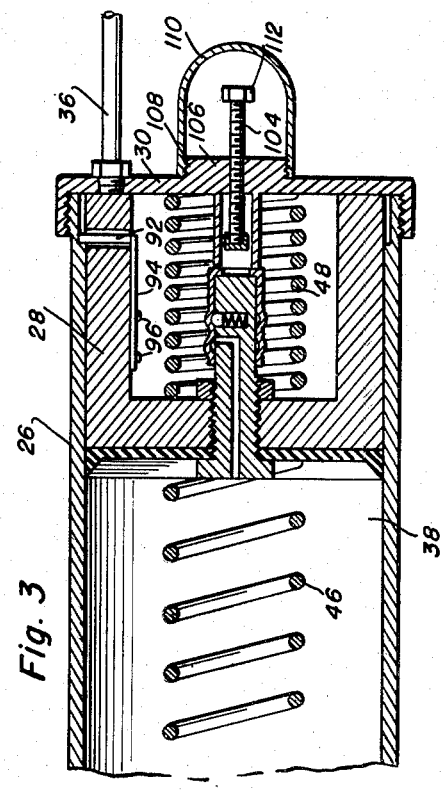
Figure 3 is a sectional view similar to Figure 2, shown partly broken away, and illustrating the piston and associated parts in position for cutting off the flow of hydraulic fluid therethrough to a conduit in communication therewith, and such as may be brought about by rupture of the conduit communicating therewith.

The hydraulic preserver device or safety valve of the invention as illustrated in Figures 2, 3 and 4, comprises a cylinder 26 having a piston 28 slidably disposed therein, the cylinder being provided with a head 30 and opposite end portion 32 which are suitably threaded thereon. A pipe line 34 is connected to the cylinder end plate 32 which is connected to the main line 18 which, in turn, is in communication with the master cylinder and which supplies hydraulic fluid to the cylinder 26 and connecting branch conduit 36. The latter conduit is in communication with the cylinder 26 being connected to the cylinder head 30 as illustrated in Figure 2.

Cylinder 26 is divided by the piston 28 into two fluid pressure chambers 38 and 40. The fluid pressure supply is admitted to chamber 38 through the port 42, connected to pipe 34 and the fluid pressure is transmitted outwardly from the chamber 40 through the discharge port 44 and communicating pipe line connection 36 which, in turn, is connected to or is integral with one of the branch lines 20.

The piston 28 is of E-shaped cross section and is maintained more or less in the central portion of the cylinder 26 by the opposed coil spring members 46 and 48 located in chambers 38 and 40 respectively. These coil springs are arranged to be compressed or tensioned between the piston on the one hand and the respective opposite end of the cylinder on the other, as illustrated more clearly in Figure 2.

Arranged centrally of the piston and carried thereby is an elongated plug 50 having a threaded body portion 52 which is arranged to fit into a correspondingly threaded aperture 54 in the piston head portion 56. A gasket 58, made of rubber, leather or the like flexible material is suitably attached to the piston head 56, the outer periphery 60 of the gasket comprising a thickened cupped edge 62 which is flexed outwardly to provide an annular ring sealing means for the piston, and an integral flange 64 on the outer end of the plug 50 is arranged to engage and clampingly secure the gasket 58 onto the piston head.

The threaded plug 50 comprises a central passageway or channel 66 for the passage of hydraulic fluid from chamber 38 of the cylinder to the opposite chamber 40 on the other side of the piston. Thus, the inlet port 68 of the passageway 66 is in communication with the chamber 38, and at the opposite end of a passageway 66 the same is turned laterally and is provided with an outlet port 70 in the side wall of the body of the plug. This latter port opens into the chamber 40. The plug 50 is suitably locked in place on the piston head by nut 72 which is threaded onto the body portion 52.

To control the passage of hydraulic fluid through the channel 66, the body portion 52 of the plug 50 is extended as at 74 and is suitably shaped to receive a cartridge valve member 76. This cartridge valve member comprises a cylindrical body 78 which is open at one end and adapted to telescope over the outer end of the body portion 74 of the plug 50. The cylindrical wall of the cartridge 76 is adapted to engage over the outlet port 70 to close the same when the cartridge is moved to the left sufficiently, as illustrated in Figure 3. The cylindrical body member 78 is provided with spaced annular grooves 80 and 82 which are shaped to receive a spring actuated ball 84, and forming a bullet latch, positioned in the body portion 74. The latch 84 thus provides for releasably positioning the cartridge valve in open or closed position relative to the outlet port 70. At the opposite end the cylindrical body 78 is provided with a central aperture 86 for the purpose hereinafter to be described.

The cylinder 26 is provided with an annular groove or offset portion 90 adjacent the head member 30. This groove is arranged to cooperate with a latching pin means 92 which is slidably positioned in the wall of the piston 28, being urged outwardly against the wall of the piston by means of a leaf spring 94 suitably attached as by means of screws 96 to the innerwall of the piston, as shown in Figures 2 and 3.

For actuating the cartridge valve member 76, an integral sleeve 98 is provided on the cylinder head 30 and arranged centrally thereof so as to extend inwardly in juxtaposed position to the cartridge valve 76. Upon movement of the piston sufficiently far to the right the annular shoulders 100 on the cartridge 76 are adapted to engage the opposed shoulders 102 on the sleeve 98, and upon further movement of the piston toward the right the cartridge valve 76 is slidably forced to the left so that the cylindrical wall member 78 closes the port 70. A cap screw 104 is threaded into the head portion 30 through a central boss 106 and is arranged to extend longitudinally through the center of the sleeve 94. This boss 106 is threaded, as at 108, and receives a housing 110 which is arranged to enclose the outer end of the cap screw 104 and the integral head 112 thereon.

In operation of the brake preserver of this invention, the piston 28 during normal operation of the braking system remains centrally of the cylinder 26 by action of the coil springs 46 and 48. Upon rupture or breakage of a conduit such as at 36, in Figure 2, the fluid pressure on the piston 28 causes it to slide to the right, whereupon the pin 92 engages in the groove 90 and locks the piston in the end position, as shown in Figure 3. During this movement of the piston to the right, the shoulders of the sleeve 102 engage the outer ends of the cartridge 76 at 100 and cause the cartridge valve to slide to the left closing the port 70. In this manner the hydraulic fluid is prevented from entering the chamber 40 and escaping through the broken pipe connection thereto.

In initially filling the device with hydraulic fluid, the cap screw 104 will be threaded sufficiently into the head of the cylinder so that the inner end lug 114 will pass through the aperture 86 of the cartridge valve 76 and serve as a stop for the body 74 of the piston. In this manner, the latching pin 92 is prevented from entering the groove 90, and the sleeve 98 is also prevented from engaging the end of the cartridge 76 and closing the port 70. After the device is filled with hydraulic fluid and the system is ready to operate the cap screw 104 is retracted into the housing 110 so that the end or lug member 114 is positioned in the sleeve, such as shown in Figure 2. In this condition, the device is ready to operate.

Although the preferred embodiments of the invention have been illustrated and described, it will be understood that variations and modifications of the details of construction may be made by those skilled in the art without departing from the spirit and scope of the invention as indicated by the appended claim.

What is claimed as new is as follows:

A brake cut-off device for a pressure line of a hydraulic brake comprising a cylinder adapted to be interposed in said line and having ported pressure supply and discharge ends with the ports adapted to be connected in said line, a pressure operated spring tensioned piston slidable in said cylinder toward said discharge end, a sleeve valve carried by said piston operative into open and closed positions and passing fluid from said supply end to said discharge end when open, means on said discharge end operatively engaged with and closing said valve by sliding of said piston toward said discharge end, and means on said piston and cylinder, respectively, coacting to lock the piston against sliding when the valve is closed, said sleeve valve comprising a sleeve on said piston having a discharge port, and a cartridge on said sleeve slidable thereon for closing the port in the sleeve.

References Cited in the file of this patent

UNITED STATES PATENTS

| | | |
|---|---|---|
| 1,724,881 | Lund | Aug. 13, 1929 |
| 1,905,077 | Walker | Apr. 25, 1933 |
| 2,077,646 | Snyder | Apr. 20, 1937 |
| 2,093,015 | Madden | Sept. 14, 1937 |
| 2,127,849 | Stone | Aug. 23, 1938 |
| 2,353,191 | Samiran | July 11, 1944 |
| 2,386,585 | Blank | Oct. 9, 1945 |
| 2,515,516 | Kalen | July 18, 1950 |

FOREIGN PATENTS

| | | |
|---|---|---|
| 486,512 | Great Britain | Sept. 2, 1936 |